United States Patent
Fischer et al.

(10) Patent No.: US 8,121,589 B2
(45) Date of Patent: Feb. 21, 2012

(54) REPORTING MEASUREMENTS FROM A MOBILE STATION TO A NETWORK AND ASSOCIATED HANDOVER CONTROL METHOD

(75) Inventors: Patrick Fischer, Reine (FR); Romain Masson, Paris (FR)

(73) Assignee: LG Electronics Inc., Seoul (KR)

(*) Notice: Subject to any disclaimer, the term of this patent is extended or adjusted under 35 U.S.C. 154(b) by 522 days.

(21) Appl. No.: 12/350,042

(22) Filed: Jan. 7, 2009

(65) Prior Publication Data
US 2009/0247150 A1    Oct. 1, 2009

Related U.S. Application Data

(60) Provisional application No. 61/041,227, filed on Mar. 31, 2008.

(51) Int. Cl.
*H04Q 7/20* (2006.01)

(52) U.S. Cl. ............ 455/423; 455/422.1; 455/424; 455/425; 455/426.1; 455/67.11; 455/67.16; 455/67.14; 455/67.13; 455/436; 455/439

(58) Field of Classification Search .......... 455/439, 455/442, 405, 423
See application file for complete search history.

(56) References Cited

U.S. PATENT DOCUMENTS

| | | | |
|---|---|---|---|
| 6,845,238 B1 * | 1/2005 | Muller | 455/436 |
| 2004/0242199 A1 | 12/2004 | Edlund et al. | |
| 2007/0026810 A1 | 2/2007 | Love et al. | |
| 2007/0097918 A1 | 5/2007 | Cai et al. | |
| 2008/0014941 A1 | 1/2008 | Catovic et al. | |

* cited by examiner

*Primary Examiner* — Charles Appiah
*Assistant Examiner* — Randy Peaches
(74) *Attorney, Agent, or Firm* — Birch, Stewart, Kolasch & Birch, LLP

(57) ABSTRACT

A mobile station receives dedicated signaling from the network to obtain measurement configuration data specified for it. The measurement configuration data stored in the mobile station include: measurement object elements each designating communication resources on which measurements are requested by the network; reporting configuration elements each defining reporting criteria to trigger a measurement report from the mobile station to the network and a reporting format indicating at least one quantity included in the measurement report; and measurement identity elements each identifying a relationship between a measurement object element and a reporting configuration element such that any measurement report sent from the mobile station in accordance with this reporting configuration element includes at least one quantity measured on communication resources designated by the corresponding measurement object element. Storage by the mobile station of at least one measurement identity element identifying a relationship between a stored element, being a measurement object element or a reporting configuration element, and an unspecified element is enabled.

12 Claims, 5 Drawing Sheets

REPORTING MEASUREMENTS FROM A MOBILE STATION TO A NETWORK AND ASSOCIATED HANDOVER CONTROL METHOD

This application claims priority of U.S. Provisional Application No. 61/041,227 filed on Mar. 31, 2008, the content of which is incorporated herein by reference.

BACKGROUND OF THE INVENTION

1. Field of the Invention

The present invention relates to the configuration of measurements and their reporting from wireless devices in a cellular communications network. While it is described below in the context of an LTE ("long term evolution") type of cellular network for illustration purposes and because it happens to be well suited to that context, those skilled in the communication art will recognize that the invention disclosed herein can also be applied to various other types of cellular networks.

2. Discussion of the Related Art

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long term evolution (LTE) of UMTS is under discussion by the 3rd generation partnership project (3GPP) that standardized UMTS.

FIG. 1 is a block diagram illustrating network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an Evolved Packet Core (EPC) and one or more user equipment. The E-UTRAN may include one or more evolved NodeB (eNodeB, or eNB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also be referred to as a mobile station (MS), a user terminal (UT), a subscriber station (SS) or a wireless device.

An eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including distribution of paging messages to eNodeBs 20, security control, idle state mobility control, SAE bearer control, and ciphering and integrity protection of non-access stratum (NAS) signaling. The SAE gateway host provides assorted functions including termination of U-plane packets for paging reasons, and switching of the U-plane to support UE mobility. For clarity, MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

FIG. 2(a) is a block diagram depicting architecture of a typical E-UTRAN and a typical EPC. As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The PDCP layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 20 on the network side) may perform functions such as Scheduling, Automatic Repeat Request (ARQ), and hybrid automatic repeat request (HARQ). The PDCP layer (terminated in eNodeB 20 on the network side) may perform the user plane functions such as header compression, integrity protection, and ciphering.

As illustrated in FIG. 2(c), the RLC and MAC layers (terminated in an eNodeB 20 on the network side) perform the same functions as for the control plane. As illustrated, the RRC layer (terminated in an eNodeB 20 on the network side) may perform functions such as broadcasting, paging, RRC connection management, Radio Bearer (RB) control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 10 may receive broadcasts of system information and paging information while the UE specifies a Discontinuous Reception (DRX) configured by NAS, and the UE has been allocated identification (ID) which uniquely identifies the UE in a tracking area. The UE 10 monitors a paging signal at a specific paging occasion of every UE specific paging DRX cycle. Also, in RRC-IDLE state, no RRC context is stored in the eNodeB.

In RRC_CONNECTED state, the UE 10 has an E-UTRAN RRC connection and a context in the E-UTRAN, such that transmitting and/or receiving data to/from the network (eNodeB) becomes possible. Also, the UE 10 can report channel quality information and feedback information to the eNodeB.

In RRC_CONNECTED state, the E-UTRAN knows the cell to which the UE 10 belongs. Therefore, the network can transmit and/or receive data to/from UE 10, and it can control mobility (handover) of the UE. To make handover decisions, the network takes into account measurements made by the UE on radio channels used in its current cell and other radio channels of adjacent cells. The UE performs and reports measurements in accordance with measurement configuration data as provided by the network for each UE.

The E-UTRAN provides the measurement configuration applicable for a UE in RRC_CONNECTED state by means of dedicated signaling used to configure or reconfigure the RRC connection. A UE can be requested to perform different types of measurement. Intra-frequency measurements are typically specified to be performed at the downlink carrier frequency of the serving cell. In addition, inter-frequency measurements are often specified to be performed at frequencies that differ from the downlink carrier frequency of the serving cell. Measurements of frequencies used by other radio access technologies (RAT), e.g. UTRAN, GERAN ("GSM-EDGE Radio Access Network"), CDMA2000 ("Code Division Multiple Access '2000"), etc., can also be specified.

The measurement configuration data for a given UE includes measurement identity (ID) elements, measurement object elements and reporting configuration elements.

A measurement object element designates the objects, i.e. communication resources, on which the UE is required to perform the measurements. For intra-frequency and inter-frequency measurements, a measurement object is a single E-UTRA carrier frequency. For inter-RAT measurements, a measurement object is a set of cells on a single carrier frequency or a set of carrier frequencies, depending on the technology.

Each reporting configuration element defines reporting criteria and a reporting format. Once defined, the reporting criteria trigger the UE to send a measurement report. There are periodical types of criteria, a periodicity of reporting then being included in the reporting criterion. Other reports are event-triggered, a with a descriptor of the relevant event in the reporting criterion. There can also be event-triggered periodical reports, generated periodically after detection of a specified event by the UE. The reporting format indicates the quantities that the UE must include in the measurement report and sometimes some associated information, e.g. a number of cells to report.

Each measurement ID element links one measurement object element with one reporting configuration element. By configuring multiple measurement identities, it is possible to link more than one measurement object to the same reporting configuration, as well as to link more than one reporting configuration to the same measurement object. When reporting to the network a measurement corresponding to a given measurement ID, abbreviated as "MID" hereafter, the UE sends a message including MID as a reference and the result(s) of the measurement performed on the measurement object pointed to by MID as specified in the reporting format of the reporting configuration pointed to by MID. Such a message is sent in accordance with the reporting criteria of the reporting configuration pointed to by MID.

A measurement configuration command from an eNodeB to a UE consists of:
  a list of measurement IDs to be removed;
  a list of measurement IDs to be added or modified;
  a list of measurement objects to be removed;
  a list of measurement objects to be added or modified;
  a list of reporting configurations to be removed;
  a list of reporting configurations to be added or modified;
  other parameters (e.g. gap configuration).

Such a way of configuring measurements from the network is flexible and has the advantage of requiring a relatively low amount of signaling when the configuration has to be changed or updated. Previously, a full set of measurement configuration data had to be transmitted to the mobile station every time there was a change in the measurement objects, criteria, formats, etc.

However, the present inventors noted that it is possible to have inconsistencies in the measurement configuration data provided by the network for a given UE. For example, the network may provide incomplete configuration or release a measurement object or reporting configuration without releasing the corresponding measurement ID. The question of how to cope with such inconsistencies thus arises.

SUMMARY OF THE INVENTION

A method of reporting measurements from a mobile station to a network is proposed. The method comprises:
  receiving dedicated signaling from the network to obtain measurement configuration data specified for said mobile station;
  storing at least one measurement object element included in the measurement configuration data, each measurement object element designating communication resources on which measurements are requested by the network;
  storing at least one reporting configuration element included in the measurement configuration data, each reporting configuration element defining reporting criteria to trigger a measurement report from the mobile station to the network and a reporting format indicating at least one quantity included in the measurement report;
  storing measurement identity elements included in the measurement configuration data, each measurement identity element identifying a relationship between a measurement object element and a reporting configuration element such that any measurement report sent from the mobile station in accordance with said reporting configuration element includes at least one quantity measured on communication resources designated by said measurement object element;

enabling storage by the mobile station of at least one measurement identity element identifying a relationship between a stored element, being a measurement object element or a reporting configuration element, and an unspecified element; and generating and transmitting measurement reports based on the measurement configuration data.

When the network provides measurement configuration data which look wrong because of a missing measurement object element or reporting configuration element, the method enables storage by the mobile station of a corresponding measurement identity element rather than returning a failure message to the network, for example an RRC reconfiguration failure message. Sending such a message, with the ensuing new attempts by the network, may be undesirable because of the amount of signaling generated and the associated processing by the stations. Indeed, a reconfiguration of the measurements often takes place in a context where the mobile station is moving away from its serving cell and may already be busy with the signaling associated with an ongoing handover procedure while the quality of the wireless link with the serving cell is deteriorating quickly.

It appears simpler and more efficient to accept incomplete measurement configuration data on the mobile station side.

Another aspect of the invention relates to a mobile station adapted to implementation of the above method. Such mobile station comprises: a receiver to obtain measurement configuration data specified for the mobile station by dedicated signaling from a network; a memory controller for storing at least one measurement object element, at least one reporting configuration element and at least one measurement identity element included in the measurement configuration data; and a measurement report generator for generating and transmitting to the network measurement reports based on the measurement configuration data. Each stored measurement object element designates communication resources on which measurements are requested by the network. Each stored reporting configuration element defines reporting criteria to trigger a measurement report to the network and a reporting format indicating at least one quantity to be included in the measurement report. Each stored measurement identity element identifies a relationship between a measurement object element and a reporting configuration element such that any measurement report sent from the mobile station in accordance with said reporting configuration element includes at least one quantity measured on communication resources designated by said measurement object element. The memory controller is arranged to enable storage of at least one measurement identity element identifying a relationship between a stored element, being a measurement object element or a reporting configuration element, and an unspecified element.

The measurement object elements, reporting configuration elements and measurement identity elements can be independently changeable and removable by the dedicated signaling. The memory controller may then be arranged, in response to removal of a measurement object element or reporting configuration element identified in a stored measurement identity element in relation to another element, to keep the storage of said measurement identity element as a measurement identity element identifying a relationship between said other element and an unspecified element.

In an embodiment, a default behavior is specified when measurement configuration data are incomplete. For example, the measurement report generator may be arranged for generating measurement reports by ignoring any stored measurement identity element identifying a relationship between a measurement object element and an unspecified reporting configuration element. Another possibility is to arrange the measurement report generator such that measurement reports are generated by ignoring any stored measurement identity element identifying a relationship between an unspecified measurement object element and a reporting configuration element defining event-triggered or event-triggered periodical reporting criteria. Still another possibility is to arrange the measurement report generator such that the measurement reports include a preset default value for any stored measurement identity element identifying a relationship between an unspecified measurement object element and a reporting configuration element defining periodical reporting criteria.

Circumstances where the network would provide incomplete measurement configuration data, leading to storage at the mobile station of one or more measurement identity elements identifying a relationship between a stored measurement object or reporting configuration element and an unspecified element, include error cases where a base station does not behave as anticipated in the standard. In such circumstances it may be undesirable to cause the mobile station to return a failure message.

In other cases, it may be a deliberate choice of the operator to provide a mobile station with incomplete measurement configuration data. This can be advantageous, in particular, in the context of a handover procedure.

Thus, another embodiment of the present invention relates to a method of controlling handover of a communication of a mobile station from a first base station of a network to a second base station of said network. In this method, the network transmits dedicated signaling to the mobile station to indicate measurement configuration data including measurement object elements, reporting configuration element and measurement identity elements. Each measurement object element designates communication resources on which measurements are requested from the mobile station by the network. Each reporting configuration element defines reporting criteria to trigger a measurement report from the mobile station to the network and a reporting format indicating at least one quantity to be included in the measurement report. Each measurement identity element identifies a relationship between a measurement object element and a reporting configuration element such that any measurement report sent from the mobile station in accordance with said reporting configuration element includes at least one quantity measured on communication resources designated by said measurement object element. The handover control method comprises:

transmitting a first dedicated signaling message from the first base station to the mobile station to remove an existing measurement object element or reporting configuration element;

keeping in the mobile station any measurement identity element that was identifying a relationship between the removed element and another element, as an element identifying a relationship between an unspecified element and said other element; and transmitting a second dedicated signaling message from the second base station to the mobile station to update the measurement configuration data such that the kept measurement identity elements identifies a relationship between said other element and an updated measurement object element or reporting configuration element.

The element removed in response to the first dedicated signaling message from the first base station and updated in response to the second dedicated signaling message from the second base station is typically a measurement object element.

The first dedicated signaling message from the first base station may be a handover command message.

BRIEF DESCRIPTION THE DRAWINGS

Other objects, features and advantages of the invention will become apparent when reading the following description on non-limiting exemplary embodiments with reference to the accompanying drawings.

FIG. 1 is a block diagram illustrating network structure of an E-UMTS (or LTE) system.

FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

DESCRIPTION OF PREFERRED
EMBODIMENTS

A method of reporting measurements from a mobile station to a network is disclosed below in the particular, non-limiting context of an LTE system as discussed in general terms in the introduction with reference to FIGS. 1, 2(a), 2(b) and 2(c).

Figure 3:
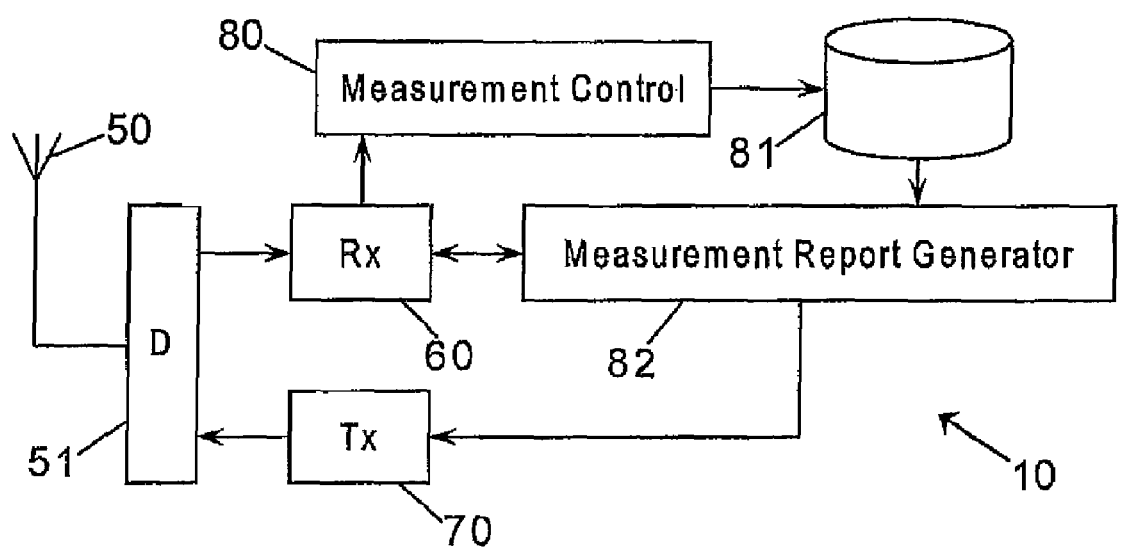
FIG. 3 is a block diagram of a UE illustrating parts relevant to the methods proposed herein.

Referring to FIG. 3, a mobile station (UE) 10 has an antenna 50 for communicating by radio with base stations 20 of the E-UTRAN (eNodeBs) and/or of other radio access networks. The antenna is coupled to a diplexer 51 for separating downlink and uplink wireless communication paths.

Figure 1:
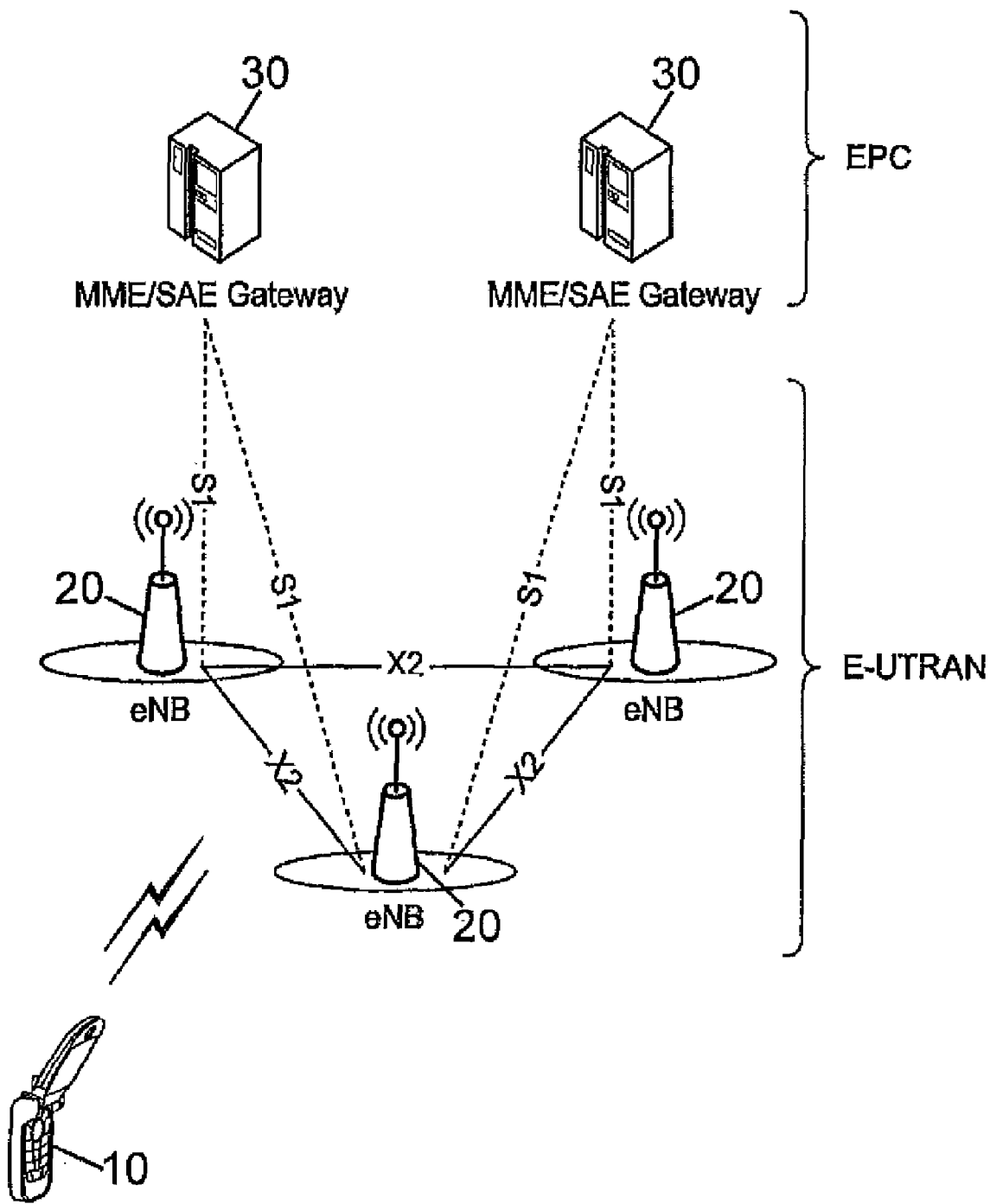
Figure 2A:
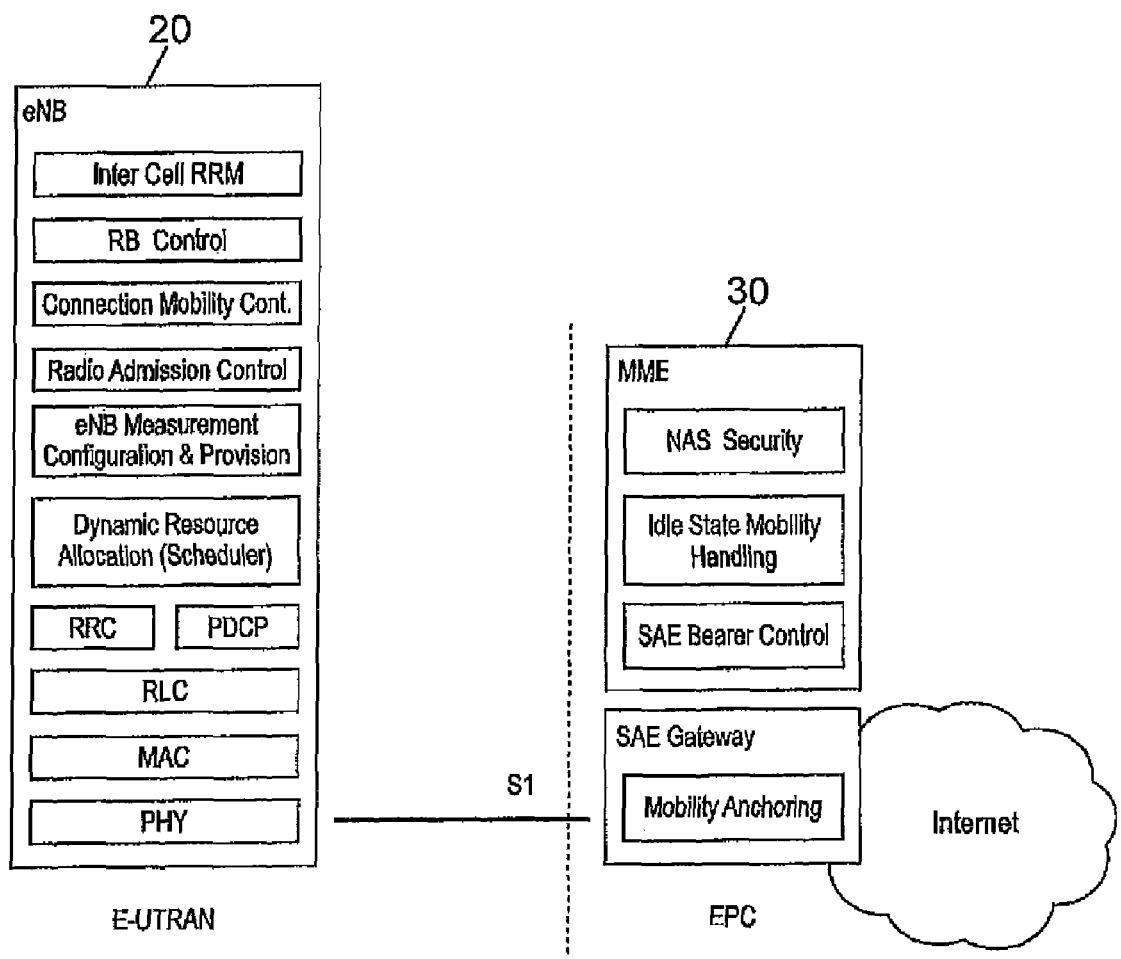
Figure 2B:
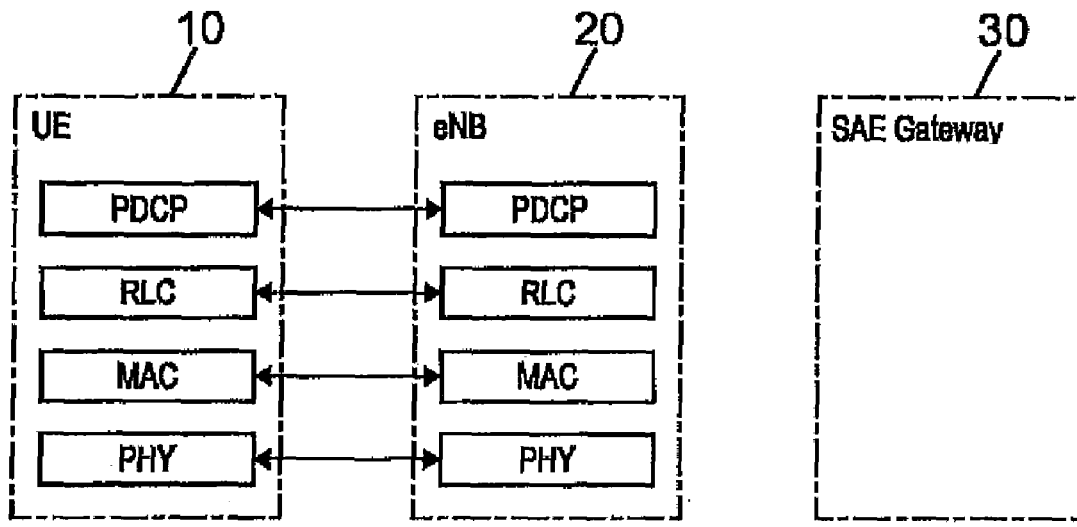
Figure 2C:
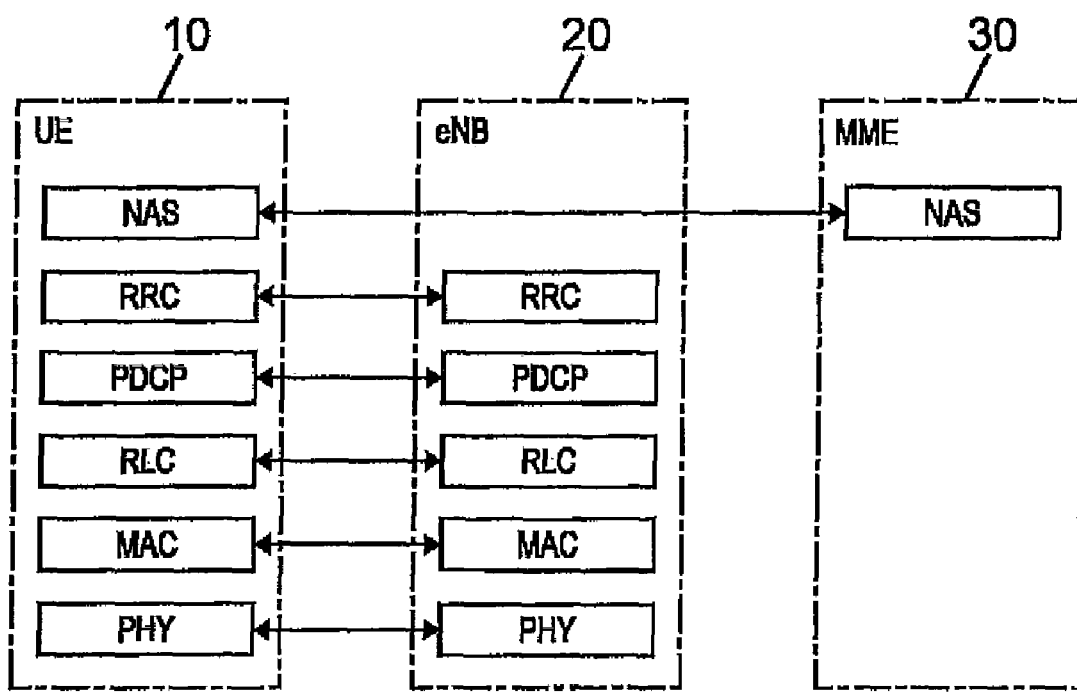

On the downlink path, a receiver 60 demodulates the signal and handles the processing of layers 1 and 2 as illustrated in FIGS. 2(b) and 2(c), i.e. the PHY, MAC and RLC processing. As part of the layer 1 processing, the receiver 60 of the UE is able to perform different kinds of measurement on the received signals such as, for example, evaluating a reference signal received power (RSRP) or a reference signal received quality (RSRQ) on specified carriers or channels. The physical resources on which the measurements are to take place are specified by the RRC control plane protocol of layer 3 by means of measurement objects as discussed above. The quantities to be measured are defined in the reporting formats which are part of the reporting configuration elements. The receiver 60 may also be configured to monitor certain measured values in order to evaluate reporting criteria also defined in the reporting configuration elements.

On the uplink path, a transmitter 70 is provided with information to be transmitted to the network and applies the RLC, MAC and PHY processing of layers 1 and 2 illustrated in FIGS. 2(b) and 2(c). The information to be transmitted includes measurement reports generated in the UE 10 as part of the RRC procedures.

For carrying out the RRC measurement procedures, the UE 10 has a measurement control unit 80, a memory 81 and a measurement report generator 82. The memory 81 contains the current measurement configuration, to which the standard refers as the UE variable VarMeasurementConfiguration. It includes the accumulated configuration of the measurements to be performed by the UE, covering intra-frequency, inter-frequency and inter-RAT mobility-related measurements.

The measurement control unit 80 is supplied with the MeasurementConfiguration information elements extracted by the receiver 60 from the downlink dedicated signaling sent by the network to the UE 10. The MeasurementConfiguration information elements are typically included in RRCConnectionReconfiguration messages, but they can also be present in other dedicated signaling messages such as a HandoverCommand message. The messages containing MeasurementConfiguration information elements will be referred to below as MEASUREMENT CONTROL messages. A MeasurementConfiguration information element contains a list of measurement IDs to be removed, a list of measurement IDs to be added or modified, a list of measurement objects to be removed, a list of measurement objects to be added or modified, a list of reporting configurations to be removed, a list of reporting configurations to be added or modified and/or other parameters (e.g. gap configuration), as mentioned above.

Based on such lists as received by the UE 10, the measurement control unit 80 maintains the current measurement configuration and writes corresponding information into memory 81. By way of illustration, Tables I, II and III show what the contents of memory 81 may be in an exemplary embodiment.

TABLE I

| MEASUREMENT OBJECTS | | |
|---|---|---|
| # | Technology | Descriptor |
| OBJ-1 | E-UTRAN | $Freq_1$ |
| OBJ-2 | GERAN | $Freq_2$ |
| OBJ-3 | E-UTRAN | $Freq_3$ |
| ... | | |

Table I illustrates an example of a list of measurement object elements which have been specified by the network by successive additions, modifications and/or removals. Each measurement object element has an identifier (OBJ-1, OBJ-2, OBJ-3, ... ), an indication of the wireless technology (RAT) using the resource to be measured and a descriptor of the resource. The descriptor depends on the RAT. For example, for E-UTRAN, intra-frequency or inter-frequency, it is typically a carrier frequency index ($Freq_1$, $Freq_3$, ... ) with, optionally, a list of cell-specific offsets and/or a list of blacklisted cells (which are not considered in event evaluation or measurement reporting). In the example of inter-RAT GERAN measurements, the descriptor provides a set of GERAN carrier frequency indexes ($Freq_2$, ... ).

Table II illustrates an example of a list of reporting configuration elements which have been specified by the network by successive additions, modifications and/or removals. Each reporting configuration element has an identifier (RC-1, RC-2, RC-3, ... ), a reporting criterion specifying when the UE must send a measurement report and a reporting format indicating which quantities the UE must include in the measurement report.

TABLE II

REPORTING CONFIGURATIONS

| # | Reporting Criterion | | | Reporting Format | |
|---|---|---|---|---|---|
| | Trigger Type | Trigger Quantity | Descriptor | Report Quantity | Max Nb. of cells |
| RC-1 | event | RSRP | $Code_1$ & $Param_1$ | RSRP & RSRQ | $Nb_1$ |
| RC-2 | periodical | / | $Period_2$ | RSRP & RSRQ | $Nb_2$ |
| RC-3 | periodical | / | $Period_3$ | RSRP | $Nb_3$ |
| ... | | | | | |

The reporting criterion can be event-triggered, periodical or event-triggered periodical as indicated by a trigger type index. The trigger type is associated with a trigger quantity which designates the quantity evaluated in the criterion and a descriptor depending on the trigger type. The trigger quantity, applicable for event-triggered and event-triggered periodical reporting, is typically a reference signal received power (RSRP) or a reference signal received quality (RSRQ) index. The descriptor includes:

a period ($Period_2$, $Period_3$, ... ) for periodical reporting;

an event code and possibly event evaluation parameters for event-triggered a reporting. Different events (A1-A5, B1-B2) are codified in the RRC protocol specification and are usually associated with event evaluation parameters such as hysteresis values, offsets or thresholds. For example, a codified event (A1) is that reception from the serving cell becomes better than a threshold taking into account a hysteresis value, another codified event (A2) is that reception from the serving cell becomes worse than a threshold taking into account a hysteresis value, etc. Such codes and parameters are stored in the reporting criteria when used;

a period, an event code and possibly event evaluation parameters for event-triggered periodical reporting.

The reporting format indicates the quantity or quantities to be reported to the network, which can be the same as the trigger quantity for event-triggered or event-triggered periodical reporting or a different quantity, usually RSRP, RSRQ or both. The reporting format may also indicate a maximum number of cells for which measurements are to be reported.

TABLE III

MEASUREMENT IDENTITIES

| # | Measurement Object | Reporting Configuration |
|---|---|---|
| MID-1 | OBJ-1 | RC-2 |
| MID-2 | OBJ-2 | RC-1 |
| MID-3 | OBJ-3 | RC-3 |
| ... | | |

Table III illustrates an example of a list of measurement ID elements which have been specified by the network by successive additions, modifications and/or removals. Each measurement ID element links a measurement object element and a reporting configuration element. It has an identifier (MID-1, MID-2, MID-3, ... ), a pointer to a measurement object element, typically its identifier OBJ-i (i=1, 2, ... ) in Table I, and a pointer to the linked reporting configuration element, typically its identifier RC-j (j=1, 2, ... ) in Table II.

The measurement report generator 82 accesses the measurement IDs stored in memory 81 to configure the receiver 60 so that it performs the measurements as specified in the measurement objects and related reporting configurations. The generator 82 compiles the results into measurement reports sent to the serving eNodeB 20 in accordance with the reporting criteria. The different measurement ID elements of Table III must be taken into account in this process.

However, it can happen that the network sends a MEASUREMENT CONTROL message having a Measurement-Configuration information element to remove a measurement object element without removing a measurement ID element linking it to a reporting configuration element. Likewise, it can happen that the network controls removal of a reporting configuration element while keeping a measurement ID element linking it to a measurement object element. If such a removal happens, the measurement control unit 80 of the UE is able to detect an inconsistency.

Assume for example that the serving eNodeB 20 removes OBJ-3 in Table I without removing MID-3 in Table III. The UE is then unable to generate a proper measurement report as far as MID-3 is concerned. A typical behavior would then be to send an error message to the network to request correction. Instead, it is proposed to accept a measurement ID element such as MID-3 even though one of its constituent elements is missing. In our example, MID-3 points to the reporting configuration element RC-3 linked to a measurement object element OBJ-3 which is unspecified since it was deleted from Table I.

As storage of an incomplete measurement ID element which identifies a relationship between a stored element (measurement object or reporting configuration) and an unspecified element is enabled, it may be useful to define a default behavior for the UE 10 when such an incomplete measurement ID element is in memory 81.

The default behavior may be dependent on which element is missing in the measurement ID. An appropriate way of defining the default behaviors is as follows:

where the unspecified element is the reporting configuration element, the measurement report generator 82 simply ignores the incomplete measurement ID element. In other words, no measurement is reported on the measurement object with respect to the incomplete measurement ID;

where the unspecified element is the measurement object element and the reporting configuration element defines event-triggered or event-triggered periodical reporting criteria, the measurement report generator 82 simply ignores the incomplete measurement ID element;

where the unspecified element is the measurement object element and the reporting configuration element defines periodical reporting criteria, the measurement report generator 82 is configured to generate measurement reports including a preset default value for the incomplete measurement ID element. The preset default value can correspond to $-\infty$ (for example), or it can be left to implementation of the UE. It will not be interpreted as an actual measurement by the network.

The existence of an incomplete measurement ID element in a UE 10 may result from an error from the network, which may not be worth correcting by additional signaling load. In certain cases, it may also be the result of a deliberate configuration strategy by the network. In particular, storing an incomplete measurement ID may allow the network to subsequently configure the missing measurement object or reporting configuration.

An example of the latter configuration strategy takes place at the time of handover. The network can release one of the components of a measurement ID element by means of the handover command, for example the measurement object element, so that the UE 10 stops the corresponding measurement. In order to keep a small-sized handover command message, the network does not include the new measurement object to be linked by the measurement ID. This new measurement object is subsequently set by the network, i.e. the target eNodeB, in order to complete the configuration.

Figure 4:
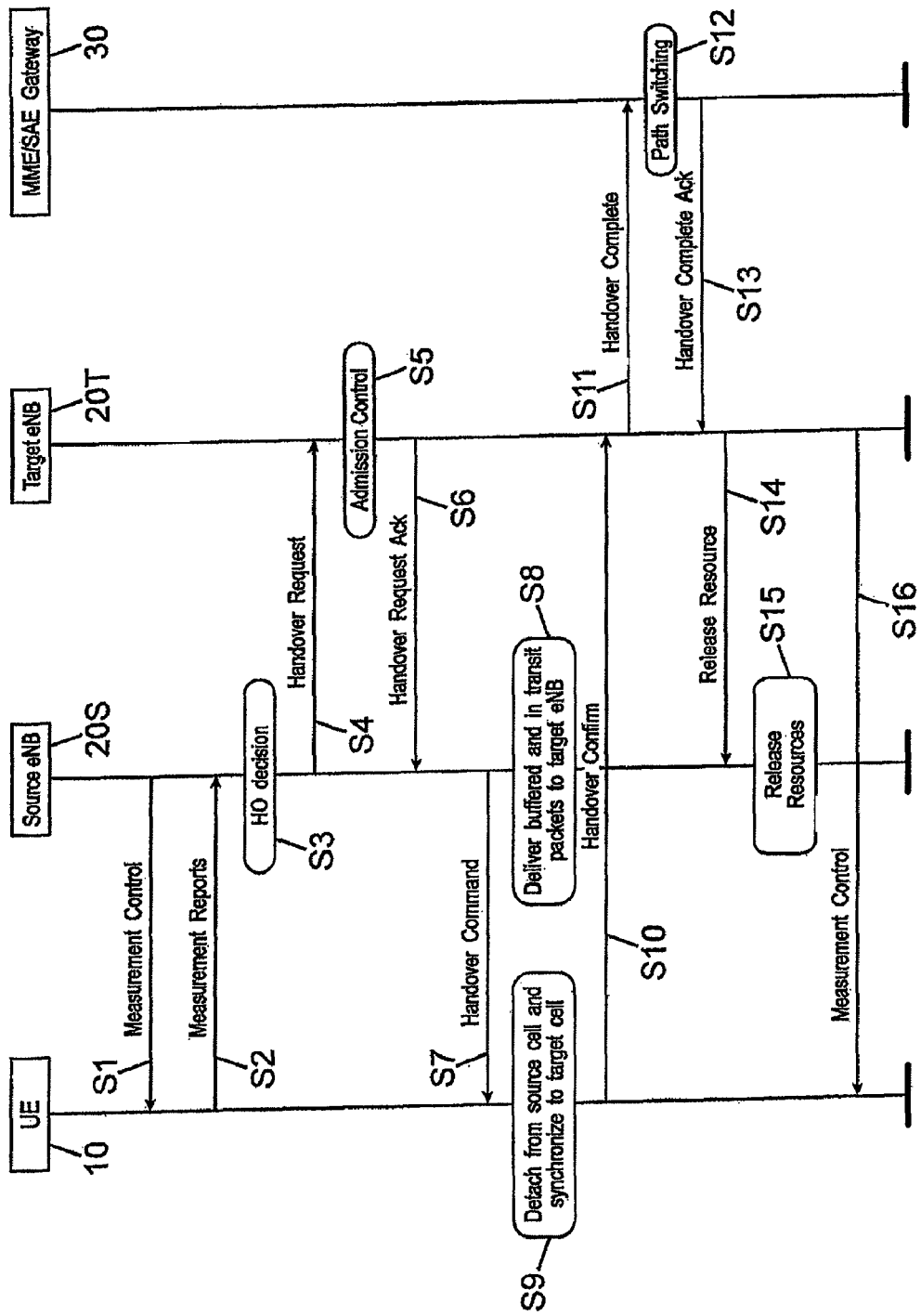
FIG. 4 is a flow chart of an exemplary handover control procedure.

FIG. 4 illustrates a handover procedure in an LTE system. The handover procedure is made to transfer, or hand off, a pending communication from a source cell, serviced by a source eNodeB 20S, to a target cell, serviced by a target eNodeB 20T. We consider here the case where the source and target cells are not serviced by the same eNodeB.

The source eNodeB 20S configures the UE measurement procedures by sending one or more MEASUREMENT CONTROL messages to the UE 10 in the RRC_CONNECTED state, as illustrated in step S1 of FIG. 3. The UE 10 is then triggered to send MEASUREMENT REPORT messages (step S2) according to the rules set by the measurement configuration data as discussed above.

For each UE in the RRC_CONNECTED state, the source eNodeB 20S runs one or more handover control algorithms whose inputs include the measurements reported by the UE 10 and possibly other measurements made by the source eNodeB 20S. Depending on the measurements, the source eNodeB 20S may decide to hand off the UE 10 to a target eNodeB 20T (step S3 of FIG. 4). When this occurs, the source eNodeB 20S issues a HANDOVER REQUEST message to the target eNodeB 20T (step S4), passing necessary information to prepare the handover on the target side. Such information includes a UE X2 signaling context reference at the source eNodeB, a UE S1 EPC signaling context reference, a target cell identifier, an RRC context and a SAE bearer context. The UE X2 and UE S1 signaling context references enable the target eNodeB to address the source eNodeB and the EPC. The SAE bearer context includes necessary radio network layer (RNL) and transport network layer (TNL) addressing information.

An admission control function may be performed by the target eNodeB 20T depending on the received SAE bearer quality of service (QoS) information to increase the likelihood of a successful handover, if the necessary resources are available at the target eNodeB (step SS of FIG. 4). If the handover is admitted, the target eNodeB 20T configures the resources according to the received SAE bearer QoS information and reserves a new cell-radio network temporary identifier (C-RNTI) for the sake of identifying the UE 10 in the target cell. The target eNodeB 20T prepares the handover in layers 1 and 2 and sends a HANDOVER REQUEST ACKNOWLEDGE message to the source eNodeB 20S (step S6). The HANDOVER REQUEST ACKNOWLEDGE message includes a transparent container to be passed to the UE 10. The container may include the new C-RNTI allocated by the target eNodeB, and possibly some other parameters such as access parameters, system information blocks (SIBs), etc. The HANDOVER REQUEST ACKNOWLEDGE message may also include RNL/TNL information for the forwarding tunnels, if necessary.

In response, the source eNodeB 20S generates the HANDOVER COMMAND message of the RRC protocol and sends it towards the UE 10 (step S7). In parallel (step S8), the source eNodeB 20S transfers to the target eNodeB 20T part or all of the packets that are buffered for transmission to the UE and currently in transit towards the UE, as well as information relating to acknowledgement status of the packets by the UE.

The HANDOVER COMMAND message includes the transparent container, which has been received from the target eNodeB 20T. The source eNodeB applies the necessary functions of integrity protection and ciphering to the message. The UE receives the HANDOVER COMMAND message with the necessary parameters (new C-RNTI, possible starting time, target eNodeB SIBs etc.) and is thereby instructed by the source eNodeB 20S to perform the handover. The UE 10 complies with the handover command by detaching from the source cell, getting synchronization and accessing the target cell (step S9).

When the UE 10 has successfully accessed the target cell, it sends an HANDOVER CONFIRM message to the target eNodeB 20T using the newly allocated C-RNTI (step S10 in FIG. 4) to indicate that the handover procedure is completed on the UE side. The target eNodeB 20T verifies the C-RNTI sent in the HANDOVER CONFIRM message. If the verification is positive, the EPC is informed by the HANDOVER COMPLETE message from the target eNodeB 20T (step S11) that the UE has changed cell. In step S12, the EPC switches the downlink data path to the target side and it releases any U-plane/TNL resources towards the source eNodeB 20S. The EPC confirms by returning a HANDOVER COMPLETE ACK message in step S13.

The target eNodeB 20T then informs the source eNodeB 20S that the handover was successful by sending a RELEASE RESOURCE message (step S14), which triggers the release of resources, i.e. radio and C-plane related resources associated to the UE context, by the source eNodeB in step S15.

The HANDOVER COMMAND message of step S7 can include one or more MeasurementConfiguration information elements to deactivate certain UE measurements until the handover is completed. This can be done in the context of the invention by removing components of the corresponding measurement IDs, preferably the measurement object elements relating to the cells that are not worth monitoring during execution of the handover. The target eNodeB will subsequently, for example after the handover is confirmed by both the UE and the EPC, specify the missing components by means of another MEASUREMENT CONTROL message transmitted to the UE 10 in step S16. This other message adds or modifies the missing measurement objects so that it corresponds to the neighbor cells that are supposed to be monitored by the UE at its new location. Those monitored neighbor cells may be the same as before the handover, or different.

From this point, the memory 81 of the UE 10 again contains a consistent set of measurement configuration data, and it can perform the measurements in accordance with the regular procedure.

The handover procedure thus adapted makes it possible to temporarily deactivate measurement reports by the UE that are not most useful for mobility management, by using a minimum signaling load. This is advantageous because the UE is typically busy carrying out other procedures while the quality of the available radio link may be poor. It is not desirable in such circumstances to require the UE to perform and report measurements that may anyway not be exploited by the network until the handover procedure is completed.

Embodiments of the invention have been disclosed above in the illustrative case of a 3GPP LTE system. Those skilled in the wireless communication art will appreciate that various modifications can be brought to these embodiments without departing from the invention and from the attached claims. They will also appreciate that the invention is applicable to communications systems other than 3GPP LTE systems.

The invention claimed is:

1. A method of reporting measurements from a mobile station to a network, comprising:
   receiving dedicated signaling from the network to obtain measurement configuration data specified for the mobile station;
   storing at least one measurement object element, at least one reporting configuration element and at least one measurement identity element included in the measurement configuration data,
   the at least one measurement object element designating communication resources on which measurements are requested by the network,
   the at least one reporting configuration element defining reporting criteria to trigger a measurement report from the mobile station to the network and a reporting format indicating at least one quantity included in the measurement report,
   the at least one measurement identity element linking a measurement object element to a reporting configuration element such that any measurement report sent from the mobile station in accordance with the reporting configuration element includes at least one quantity measured on communication resources designated by the measurement object element;
   storing at least one incomplete measurement identity element linking a stored element, which is a reporting configuration element or a measurement object element, to an unspecified element, which is a removed measurement object element or a removed reporting configuration element, when receiving measurement configuration data to remove the measurement object element or the reporting configuration element without removing the measurement identity element linking it to the reporting configuration element or the measurement object element; and
   generating and transmitting measurement reports based on the measurement configuration data.

2. The method of claim 1, wherein the at least one measurement object element, the at least one reporting configuration element and the at least one measurement identity element are independently changeable and removable.

3. The method of claim 1, wherein the generating step includes the step of generating measurement reports by ignoring any stored measurement identity element linking a measurement object element to an unspecified reporting configuration element.

4. The method of claim 1, wherein the generating step includes the step of generating measurement reports by ignoring any stored measurement identity element linking an unspecified measurement object element to a reporting configuration element defining event-triggered or event-triggered periodical reporting criteria.

5. The method of claim 1, wherein the generating step includes the step of generating measurement reports including a preset default value for any stored measurement identity element linking an unspecified measurement object element to a reporting configuration element defining periodical reporting criteria.

6. A mobile station, comprising:
   a receiver configured to obtain measurement configuration data specified for the mobile station by dedicated signaling from a network;
   a memory controller configured to store at least one measurement object element, at least one reporting configuration element and at least one measurement identity element included in the measurement configuration data,
   the at least one measurement object element designating communication resources on which measurements are requested by the network;
   the at least one configuration element defining reporting criteria to trigger a measurement report to the network and a reporting format indicating at least one quantity to be included in the measurement report;
   the at least one measurement identity element linking a measurement object element to a reporting configuration element such that any measurement report sent from the mobile station in accordance with said reporting configuration element includes at least one quantity measured on communication resources designated by the measurement object element; and
   a measurement report generator configured to generate and transmit to the network measurement reports based on the measurement configuration data,
   wherein the memory controller is configured to store at least one incomplete measurement identity element linking a stored element, which is a reporting configuration element or a measurement object element, to an unspecified element, which is a removed measurement object element or a removed reporting configuration element, when measurement configuration data to remove the measurement object element or the reporting configuration element without removing the measurement identity element linking it to the reporting configuration element or the measurement object element, is received.

7. The mobile station of claim 6, wherein the at least one measurement object element, the at least one reporting configuration element and the at least one measurement identity element are independently changeable and removable by the dedicated signaling.

8. The mobile station of claim 7, wherein the memory controller is configured, in response to removal of the measurement object element or the reporting configuration element identified in a stored measurement identity element in relation to another element, to keep storage of the measurement identity element as a measurement identity element linking the other element to the unspecified element.

9. The mobile station of claim 6, wherein the measurement report generator is configured to generate measurement reports by ignoring any stored measurement identity element linking a measurement object element to an unspecified reporting configuration element.

10. The mobile station of claim 6, wherein the measurement report generator is configured to generate measurement reports by ignoring any stored measurement identity element linking an unspecified measurement object element to a reporting configuration element defining event-triggered or event-triggered periodical reporting criteria.

11. The mobile station of claim 6, wherein the measurement report generator is configured to generate measurement reports including a preset default value for any stored measurement identity element linking an unspecified measurement object element to a reporting configuration element defining periodical reporting criteria.

12. The mobile station of claim 6, wherein the received dedicated signaling comprises:
   a first dedicated signaling message from a first base station of the network having a communication with the mobile station, the first dedicated signaling message controlling removal of an existing measurement object element or reporting configuration element, wherein the memory controller is configured to keep the storage of any measurement identity element linking the removed element to another element, as an element linking an unspecified element to the other element; and a second dedicated signaling message from a second base station to which the communication is handed over, the second dedicated signaling message controlling update of the measurement configuration data such that the kept measurement identity elements links the other element to an updated measurement object element or reporting configuration element.

* * * * *